3,310,259
MISSILE GLIDE PATH MAINTAINED CONSTANT BY THE USE OF STATIC AND PITOT-HEAD PRESSURES
Norman Swift and Douglas Trevor Endean, Bristol, England, assignors to British Aircraft Corporation (Operating) Limited, a British company
Filed May 12, 1964, Ser. No. 366,758
Claims priority, application Great Britain, May 16, 1963, 19,597/63
3 Claims. (Cl. 244—3.15)

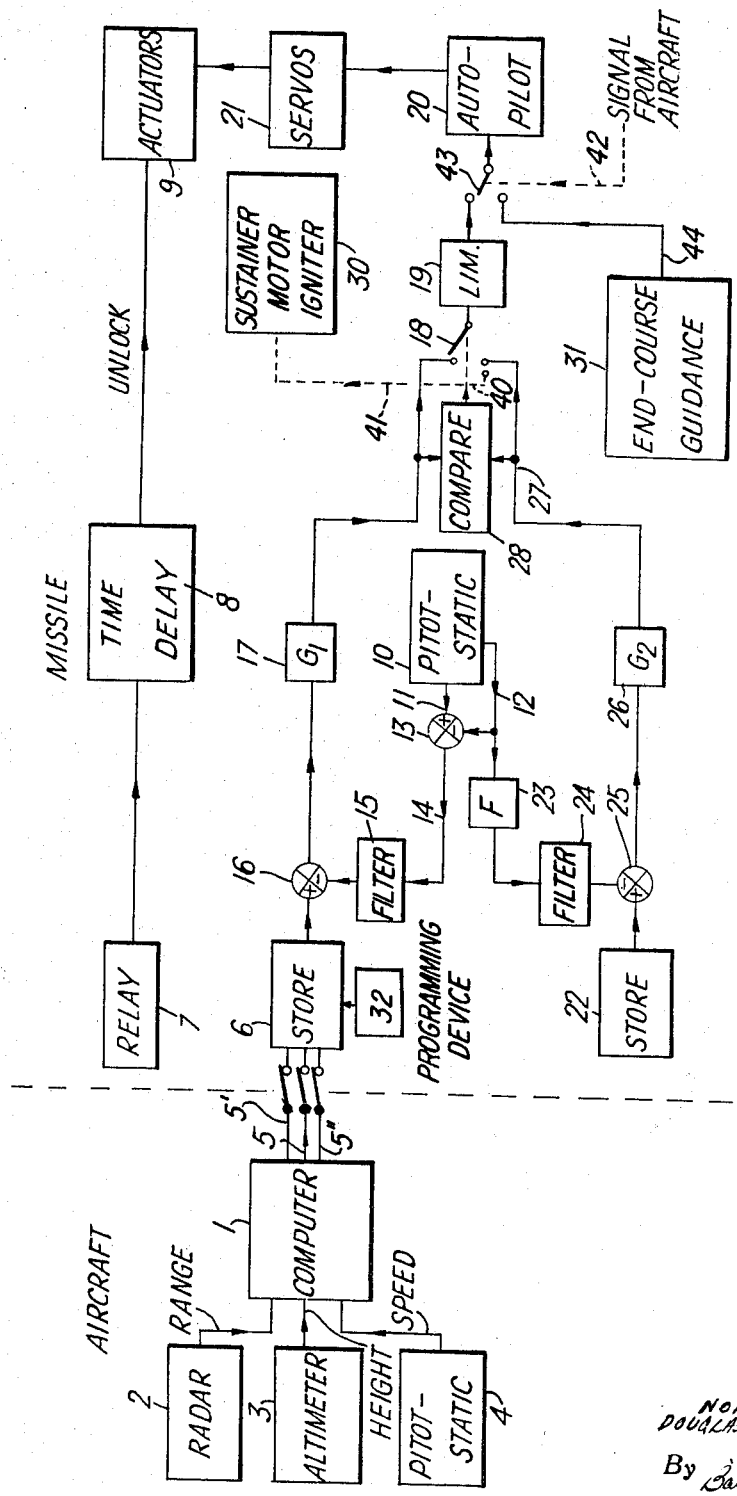

This invention is particularly, although not exclusively, concerned with an air-to-ground guided weapon system which comprises a carrier aircraft and a guided weapon, which, on release from the carrier aircraft is designed to glide from its launch altitude to a specified altitude and distance from a target, whereupon a sustainer motor is brought into action and an end-course guidance system directs the weapon, under power, to the target.

It will be appreciated that in combat conditions it may not be possible or desirable to launch the weapon at a closely defined altitude, Mach number and distance from the target. It follows that any method of controlling the gliding descent of the weapon must take into account these variable and a suitable system which is the subject of this invention will now be described.

According to the invention, a control system on a missile for regulating its ascent or descent path includes means for adjusting the flight path of the missile, instruments for measuring static and Pitot head pressures and means responsive to the difference between a given value and the result of subtracting the static pressure from the Pitot head pressure to operate the flight path adjusting means in such a manner as to tend to eliminate the said difference. The given value may vary continuously or from time to time under the control of a programme unit in the missile.

In the example described above, the angle in question is the glide path and the constant value is calculated as a function of the altitude, Mach number and distance from the target of the carrier aircraft at weapon separation, and represents the value of dynamic head or "Pitot minus static" which must be maintained by the weapon if it is to assume the desired glide path and hence range to target at the end of the glide path. Errors between the constant value demanded and the difference indicated at any instant by the weapon instruments are arranged to cause either a nose-up or nose-down pitching moment of the weapon, according to the polarity of the error, until this corrective action removes the error by equalising the difference and the demanded constant value.

This system depends on the fact that the "Pitot minus static" pressure measured by the weapon instruments is substantially constant if the weapon assumes a particular glide path angle during its descent. At this glide path angle, which is also very nearly constant throughout its gliding flight, the increase in air density and therefore static pressure as a result of change of altitude is counteracted in the "Pitot minus static" expression by a corresponding reduction in the velocity and therefore Pitot head pressure due to an increase in drag and this results in a substantially constant value for this expression.

It can be seen that by varying the constant "Pitot minus static" value demanded according to the altitude, Mach number and distance from target at launch and thereby varying the glide path angle, any required range can be selected, above a certain minimum and within the maximum glide range of the weapon. It is found that in certain cases, depending upon weapon configuration, the path to be followed by a weapon for the condition of maximum lift/drag ratio (i.e. maximum range) is almost identical to that path taken by the weapon to maintain a constant "Pitot minus static" value of approximately 300 lb./ft.$^2$.

In order to achieve maximum range for a weapon of non-optimum configuration or to modify the weapon flight path for strategic reasons it may be advantageous to replace this constant "Pitot minus static" value demanded by a variable "Pitot minus static" demand or a series of constant demands capable of being varied or selected according to a predetermined programme during the weapon flight.

In order that the invention may be better understood, an example in which a single value of "Pitot minus static" is demanded for a given flight path will now be described with reference to the accompanying drawing, which is a block diagram illustrating the aircraft and missile control systems.

Before the missile is launched the desired value of dynamic head or "Pitot minus static" must be computed. This is computed from the launch altitude for the missile, the launch velocity and the target range at the time of launch. The target range is fed into a computer 1 from the aircraft radar receiver 2 and the altitude of the aircraft is continuously fed into the computer from an altimeter 3. The velocity of the aircraft is derived from the "Pitot minus static" instrument 4. Thus the computer 1 continuously computes the dynamic head which would be required if the missile were launched immediately. In doing so, it takes into account the known increment of velocity which the missile would experience in being launched from the aircraft. The appropriate value of dynamic head is continually computed and is applied by way of a connection 5 to a store 6 in the missile. When the missile is launched the connection 5 is broken and at the same time a relay 7 is operated. The relay 7, after a time delay provided by the delay circuit 8, operates to unlock the actuators 9 to permit them to be adjusted in position to vary the flight path of the missile.

The missile trajectory control circuit includes a pressure-sensing instrument 10 which provides on conductor 11 an electric signal representing the Pitot head pressure and on conductor 12 an electric signal representing the static pressure. These two signals are applied to a differencing amplifier 13 the output of which appears on conductor 14 and represents the dynamic head, or the result of subtracting the Pitot head pressure from the static pressure. This signal is applied through a filter 15 which gives approximate proportional-plus-rate feedback to ensure adequate damping and the output of the filter 15 passes to a further differencing amplifier 16 which receives the required dynamic head signal from the store 6 and applies to an amplifier 17 of gain $G_1$ a signal representing the difference between the actual dynamic head and the required dynamic head. This signal is the one which is used for control purposes during the greater part of the descent and is applied through a switch 18 to a limiter circuit 19 and thence to the autopilot 20 which acts through the servos 21 on the actuators 9.

However, a second control circuit is provided in the particular trajectory control system which is being described. This second control circuit includes a store 22 in which there is stored an indication of a static pressure representing a particular altitude (for example 1,000 feet). The static pressure signal on conductor 12 is applied through a function generator 23, which converts the static pressure signal to an altitude signal, and a filter 24 to a differencing amplifier 25 which also receives the required altitude signal from the store 22. The output signal from the differencing amplifier is applied through an amplifier 26 of gain $G_2$ to an output conductor 17.

A comparator circuit 28 receives both the dynamic head error signal from the amplifier 17 and the altitude error signal from the amplifier 26 and operates the switch 18 to that the more positive of these error signals is passed to the autopilot 20.

In an example in which a variable value of "Pitot minus static" or a series of constant "Pitot minus static" values are to be demanded to modify the weapon flight path a series of values of dynamic head are continually computed and are applied by way of connections 5, 5′ and 5″ etc. to the store 6 in the missile. The appropriate values for a given portion of the flight path are then selected by a programming or a sequencing device 32 and passed to the differencing amplifier 16 as before.

Thus, in a typical example the missile is launched from 40,000 feet and as a consequence the altitude loop will give a very large negative demand, the stored altitude being assumed to be 1,000 feet. The signal from the dynamic head loop will give a small positive or negative demand depending upon the values of the relevant variables and will therefore be more positive than the signal from the altitude loop. As a consequence the greater part of the descent will be controlled by the dynamic pressure loop. When the missile reaches 2,000 to 3,000 feet, the values of the signals in the two loops will be more nearly equal and at some point the altimeter loop will take over and the missile will flatten out at the desired altitude.

In the particular example which is being described, the missile is in the form of a glide bomb equipped with end-course homing which, due to inherent limitations, can only be effectively used at an altitude of about 1,000 feet and within a radius of approximately 10 miles from the target. A signal from the comparator circuit 28 is passed along the line 40 to the switch 18 to lock it in the altitude loop position, thereby preventing the dynamic head loop from regaining control. This same signal is passed along the line 41, to the sustainer motor ignitor 30, thereby firing the motor to propel the weapon for the last of its journey and to enable a desired flight path, both in altitude, direction and speed to be maintained.

With the weapon in substantially level flight under power the end-course guidance system is brought into operation by a signal from the control aircraft. This signal is fed along line 42 to switch 43 which on actuation cuts out the altitude loop and substitutes control by the end course guidance system, guidance signals being passed along line 44, through switch 43 to the autopilot 20 and from thence to the control actuators 9.

The end course guidance system 31 could be of the type in which a television camera is mounted within the weapon and transmits pictures of the terrain and/or target to a controller in the controlling aircraft who can then make the necessary course corrections. An example of such a system is shown in an application filed Sept. 17, 1962, in the name of Charles Christopher Halton, which is a continuation of our earlier application S.N. 224,888.

If desired, the end-course guidance system could be brought into operation automatically, if desired, as a consequence of the assumption of control by the altitude loop.

The invention may also be applied in the guidance of a ballistic missile in its re-entry stages.

We claim:

1. A missile control system for controlling the descent path of a gliding missile, so as to maintain a predetermined substantially constant glide angle, including control surface actuating means, means for measuring static and Pitot-head pressures, and means operatively connected to said measuring means and said actuating means and responsive to the difference between a given value of dynamic head and the actual dynamic head obtained by subtracting the static pressure from the Pitot-head pressure to operate said actuating means in such a manner as to tend to eliminate the said difference and thereby to restore the descent path to the predetermined glide angle, a first store for receiving at least one given value of dynamic head before launching of the missile, and in which the means responsive to said difference includes a first differencing circuit connected to said measuring means for receiving electrical signals representing the Pitot-head and static pressures, and a second differencing circuit connected to the output of the first differencing circuit and to the first store to receive therefrom a signal representing a stored value of dynamic head, said second differencing circuit having its output connected to said actuating means, a second store for receiving an altitude value representing the minimum altitude for control of the missile by dynamic head, a third differencing circuit connected to the second store and receiving therefrom an input representing the stored altitude signal and connected to said measuring means for receiving therefrom a signal representing the missile altitude, and means connected to said second differencing circuit for switching the control of the flight path adjusting means from the second differencing circuit to the third differencing circuit when the output of the second differencing circuit is less than a given value.

2. A system according to claim 1, said switching means including comparator means connected to and receiving the control signals from said second and third differencing circuits to apply whichever control signal is the more positive to the flight path adjusting means.

3. A system according to claim 2, including a sustainer motor, and means connected to and responsive to operation of said switching means for igniting the sustainer motor when the control of the control surface actuating means is switched to the third differencing circuit, an end-course guidance system, and means to bring said system into operation.

References Cited by the Examiner

UNITED STATES PATENTS

| | | | |
|---|---|---|---|
| 2,790,946 | 4/1957 | Yates | 244—77 |
| 2,930,035 | 3/1960 | Altekruse | 244—14 X |
| 2,973,927 | 3/1961 | Miller et al. | 244—77 |
| 3,169,000 | 2/1965 | Ernst et al. | 244—77 X |

BENJAMIN A. BORCHELT, *Primary Examiner.*

M. F. HUBLER, *Assistant Examiner.*